UNITED STATES PATENT OFFICE.

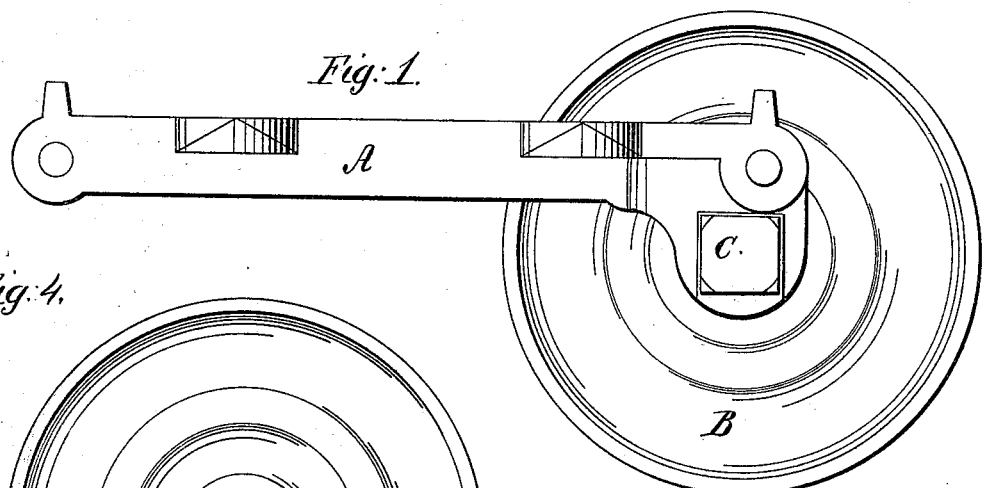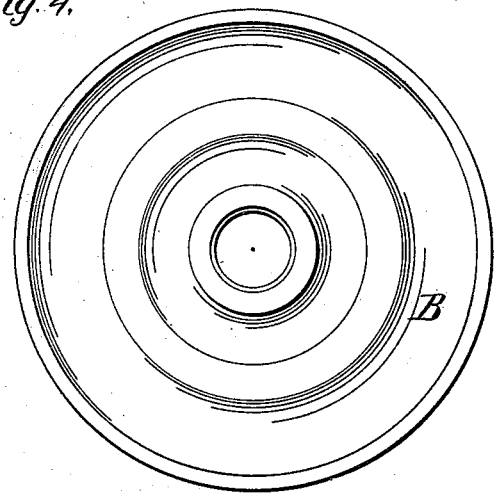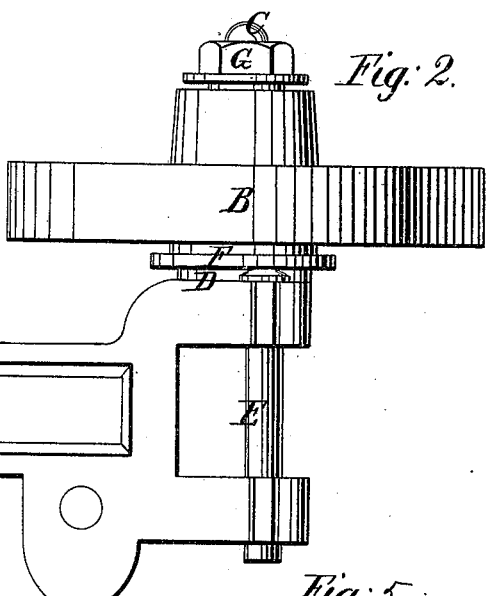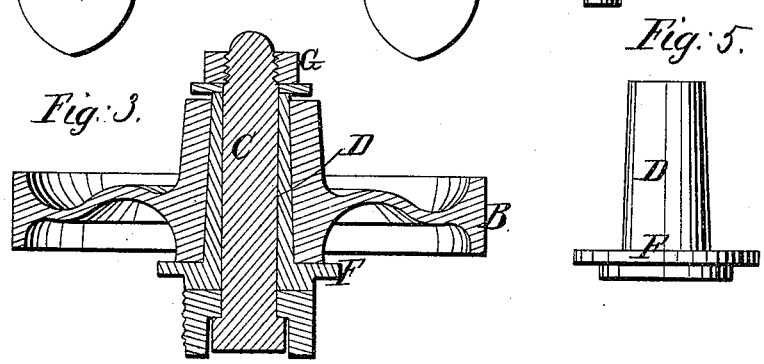

GEORGE E. BURT AND GEORGE F. WRIGHT, OF HARVARD, MASSACHUSETTS.

WHEEL AND AXLE ATTACHMENT OF HORSE-POWERS, &c.

Specification of Letters Patent No. 19,408, dated February 23, 1858.

*To all whom it may concern:*

Be it known that we, GEORGE E. BURT and GEORGE F. WRIGHT, of Harvard, in the county of Worcester and State of Massachusetts, have invented a new and Improved Axle; and we do hereby declare that the following is a full and exact description thereof, reference being had to the accompanying drawings and to the letters of reference marked thereon.

Figure 1, is a side elevation of a section of a horse power platform or chain, with a wheel attached. Fig. 2, is a top view of the same. Fig. 3, is a vertical transverse section of the wheel, thimble, bolt and nut, attached to a fragment of a horse power link or section. Fig. 4, is a side elevation of the wheel. Fig. 5, is a view of a hardened thimble or hollow tube on which the wheels revolve.

Similar letters of reference indicate corresponding parts in each of the several figures.

We are aware that chill hardened castiron has been used for boxes, and other purposes, but, the nature of our invention consists in using hardened cast iron for the wearing surfaces of both axles and wheels, in combination with wrought iron to retain the strength, which by so doing we can furnish a very cheap, and durable article for horse power axles, and other purposes, as the iron is cast around a polished steel chill to form the box in the wheel, and the thimbles are cast in chills which make the surface very smooth, and as hard as hardened steel, and require but little lubricating substance to prevent friction and wearing.

To enable others skilled in the art, to make and use our invention, we will proceed to describe its construction and operation.

A, in Figs. 1, and 2, represents a section or link of a horse power chain. B, a wheel, attached to said link by the bolt C, passing through the thimble or hollow tube D, as seen in Fig. 3.

E, in Fig. 2, represents the pin to couple the sections together, and is kept in its place by the flank F, on the thimble D, in Figs. 2, 3 and 5, and all held in their proper place by the bolt, C, and the screw nut G. And it will be readily seen by the arrangement aforesaid that when a weight is placed upon the link or axle, the bolt C, receives the strain lengthwise, in consequence of the enlarged diameter of the resting portion of the thimble D, upon the link A.

We do not claim the method of chill hardening cast iron, for we are aware it has been long known and used for boxes and other purposes, but,

What we claim as new, and desire to secure by Letters Patent is—

We claim the method of which the coupling pin E, is held in its proper place by the flanch F, on the thimble D, in combination with the bolt C, the thimble D, the wheel B, and the link A, substantially as herein set forth.

GEORGE E. BURT,
GEORGE F. WRIGHT.

Witnesses:
WILLIAM FLYD,
REUBEN WHITCOMB, Jr.